(No Model.)
H. T. KINGSBURY.
CYCLE STAND AND HOME TRAINER.
No. 593,105. Patented Nov. 2, 1897.
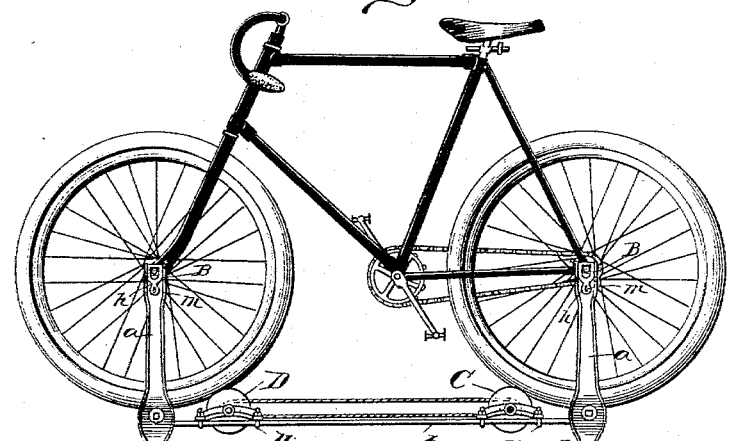
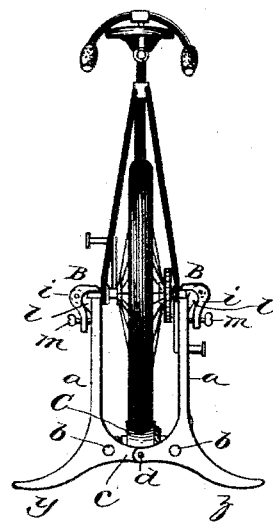
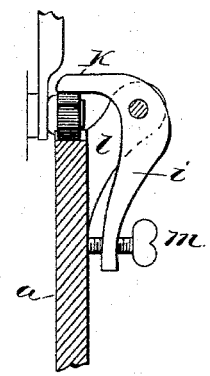
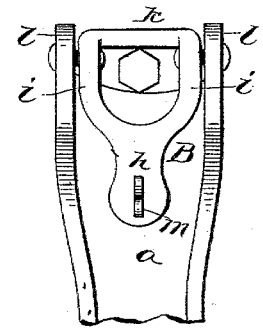
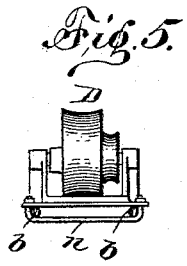
Witnesses:
J. M. Fowler Jr.
Grace Goodman
Inventor:
Harry T. Kingsbury
by Chas. L. Sturtevant,
Atty.

UNITED STATES PATENT OFFICE.

HARRY T. KINGSBURY, OF KEENE, NEW HAMPSHIRE.

CYCLE-STAND AND HOME TRAINER.

SPECIFICATION forming part of Letters Patent No. 593,105, dated November 2, 1897.

Application filed January 5, 1897. Serial No. 618,017. (No model.)

*To all whom it may concern:*

Be it known that I, HARRY T. KINGSBURY, a citizen of the United States, residing at Keene, in the county of Cheshire, State of New Hampshire, have invented certain new and useful Improvements in Cycle-Stands and Home Trainers, of which the following is a description, reference being had to the accompanying drawings, and to the letters of reference marked thereon.

My invention relates to an improvement in stands for bicycles, and also combines therewith an attachment whereby the bicycle may be used as an exercising-machine when supported on the stand, and I therefore call my device a "bicycle-stand and home trainer," although it will be understood that so far as the supporting part is concerned it may be used as a stand on which a bicycle may be placed while it is being cleaned and oiled.

The object of the invention is to provide a device to which any wheel may be applied without removing or loosening any of the nuts and which bears the weight of the wheel and rider directly on the axles of the machine, bringing no unusual strain on the frame of the bicycle. Furthermore, no part of the supporting-stand comes in contact with any enameled part of the bicycle, and when the exercising device is applied a cyclometer may be used in its usual position on the front wheel and operate the same as in outdoor riding. Furthermore, the portions of the exercising device which bear on the wheel-tires are adjustable for different lengths of wheel-base and for giving such pressure on the tires as to furnish the resistance desired.

The device is simple in construction, occupies little space, and the bicycle can be readily applied to and taken away from the stand.

In the accompanying drawings, which illustrate my invention, Figure 1 represents a side elevation of my invention, showing the bicycle supported thereon. Fig. 2 is a rear view. Fig. 3 is a cross-section showing the way the clamp is applied to the axle-nut. Fig. 4 is a front view of Fig. 3. Fig. 5 is an end view of one of the pulleys and its hanger by which motion is transmitted from the rear wheel to the front wheel.

In the drawings, A represents the supporting-standards for the bicycle, one of which is at the front and one at the rear. Each is composed of the upright pieces $a$, having at their upper ends grooves or recesses for the reception of the nuts on the wheel-axles and having an inclined angular extending part, as $y$ $z$, these two forming feet. These pieces also have inwardly-extending parts or lugs $c$, which are pivoted together, as shown at $d$, the pivot-point being located above the feet. Thus the weight of the bicycle resting on the top of the arm $a$ causes the upper ends thereof to press inwardly, and thus prevent any possibility of the wheel dropping. For clamping the bicycle-axle in place and preventing its tipping sidewise clamps B are provided at the upper end of each of the arms A. Each clamp is formed of the yoke-shaped piece $h$, its two arms $i$ being connected at their upper ends by a brace-piece $k$, each of said arms $i$ being pivoted to the upwardly and outwardly inclined arms $l$ on the standard A. A thumbscrew $m$ passes through the lower end of the yoke $h$ and bears against the standard A, so that by turning the thumb-screw in one direction it recedes from its position against the arm $a$ and allows the hook-shaped end of the yoke to disengage the nut on the axle of the wheel, while in turning said thumbscrew in the other direction the lower end of said yoke $k$ is forced away from the upright $a$ and its upper end caused to engage the nut. The yoke $h$, instead of being formed as shown, may be a solid piece, but it is preferred to make it with an opening through it to allow of the passage of the step, which is usually located on the left end of the rear axle.

It will be understood that I do not wish to be limited to any special construction of clamp, but to claim, broadly, any clamping device arranged on the upper ends of the arms $a$, which engage the axle and prevent any sidewise tipping of the wheel. The balance of the framework of the stand is made up of the longitudinal brace-rods $b$, which connect the front and rear standards A, passing through openings in the arms $c$, and the standards A are, if desired, adjustable on said brace-rods $b$ to allow for wheels having a different length of base. Upon these brace-rods are supported hangers, said hangers being composed of transverse bars $n$, adjustable on the brace-rods and having upwardly-extending inclined truss-rods united at their upper ends to form a bearing for a grooved wheel adapted to fit against the tire of the bicycle-wheel, said grooved wheel being also provided with a grooved part adapted to receive a belt which transmits motion from the rear pulley C to the front pulley D. By means of the adjustments of the hangers they may be arranged to fit bicycles in which the wheels are arranged at different distances apart, and the pressure upon the tire may be also varied.

Various minor modifications and changes in the construction of the device may be made without departing from the spirit of my invention.

Having thus described my invention, what I claim, and desire to secure by Letters Patent, is—

1. A bicycle-support comprising front and rear axle-supporting standards each formed of a pair of transversely-alined uprights pivoted together near their lower ends to swing toward each other at their upper ends, and spaced apart above said pivots to receive the bicycle-wheels and permit them to rotate, substantially as described.

2. A bicycle-support comprising the front and rear axle-supporting standards, each formed of a pair of transversely-alined uprights pivoted together near their bases, spaced apart above their pivots to receive the bicycle-wheels and provided at their upper ends with recesses or sockets for the nuts on the ends of the axles, substantially as described.

3. In a bicycle-support, a standard comprising a pair of uprights pivoted together near their lower ends, spaced apart thereabove to receive the bicycle-wheel and recessed or socketed at their upper ends for the ends of the wheel-axle, and a clamp mounted on the end of each upright to hold the axle down in the recesses or sockets, substantially as described.

4. In a bicycle-support, a standard comprising two uprights spaced apart for the bicycle-wheel and adapted to support the ends of the axle upon their upper ends, and angular clamping-levers pivoted at their angles to the upper ends of the uprights with their horizontal arms overhanging said upper ends and their depending arms extending down alongside the uprights and provided with transverse operating-screws, substantially as described.

5. In a bicycle-support, a standard comprising two uprights spaced to receive the wheel between them and adapted at their upper ends to support the ends of the wheel-axle, and angle-clamps pivoted to the upper ends of the uprights with one member projecting thereover and the other extending downwardly and provided with a screw bearing against the upright, the depending clamp members being apertured opposite the axle ends to receive the bicycle-step, substantially as described.

6. The combination with the front and rear standards, each comprising uprights pivoted together near their bases, spaced apart to receive the bicycle-wheels and adapted at their upper ends to swing toward each other and support the ends of the wheel-axles, and parallel rods connecting said standards at opposite sides of their pivots, of rollers having supporting hangers or brackets mounted adjustably on said rods and means for transmitting motion from one of said pulleys to the other, substantially as described.

In testimony whereof I affix my signature in presence of two witnesses.

HARRY T. KINGSBURY.

Witnesses:
W. L. MASON,
F. E. KINGSBURY.